United States Patent [19]

Toy et al.

[11] 4,015,507
[45] Apr. 5, 1977

[54] EJECTION SYSTEM

[75] Inventors: Henry Toy, Los Altos; Phillip Bernstein, Sunnyvale; Johan C. Van der Zwaan, Los Altos, all of Calif.

[73] Assignee: The United States of America as represented by the Secretary of the Navy, Washington, D.C.

[22] Filed: Mar. 25, 1976

[21] Appl. No.: 670,321

[52] U.S. Cl. .......................... 89/1.5 F; 244/137 R; 294/83 AE

[51] Int. Cl.² ...................... F41F 5/00; B64D 1/02

[58] Field of Search ............... 89/1.5 F, 1.5 R, 1 B; 244/137 R; 294/83 AE

[56] References Cited

UNITED STATES PATENTS

| 3,557,550 | 1/1971 | Legarra | 89/1.5 F X |
| 3,610,094 | 10/1971 | Craigie | 89/1.5 F |
| 3,756,545 | 9/1973 | Coutin | 244/137 R |
| 3,883,097 | 5/1975 | Billot | 244/137 R |
| 3,936,019 | 2/1976 | Craigie | 89/1.5 F X |

Primary Examiner—David H. Brown
Attorney, Agent, or Firm—R. S. Sciascia; Charles D. B. Curry; Elliott N. Kramsky

[57] ABSTRACT

A system to impart a desired combination of linear and rotational momentum to a projectile. A pair of thrusters are designed to engage a projectile at a fixed angle to impart the desired combination of forces when activated. A manifold tube commutes between the thrusters and a slow release cartridge. Upon ignition of the cartridge, gases enter the manifold tube to cause simultaneous thruster action, avoiding tipoff and other problems associated with the introduction of undesired force components.

6 Claims, 5 Drawing Figures

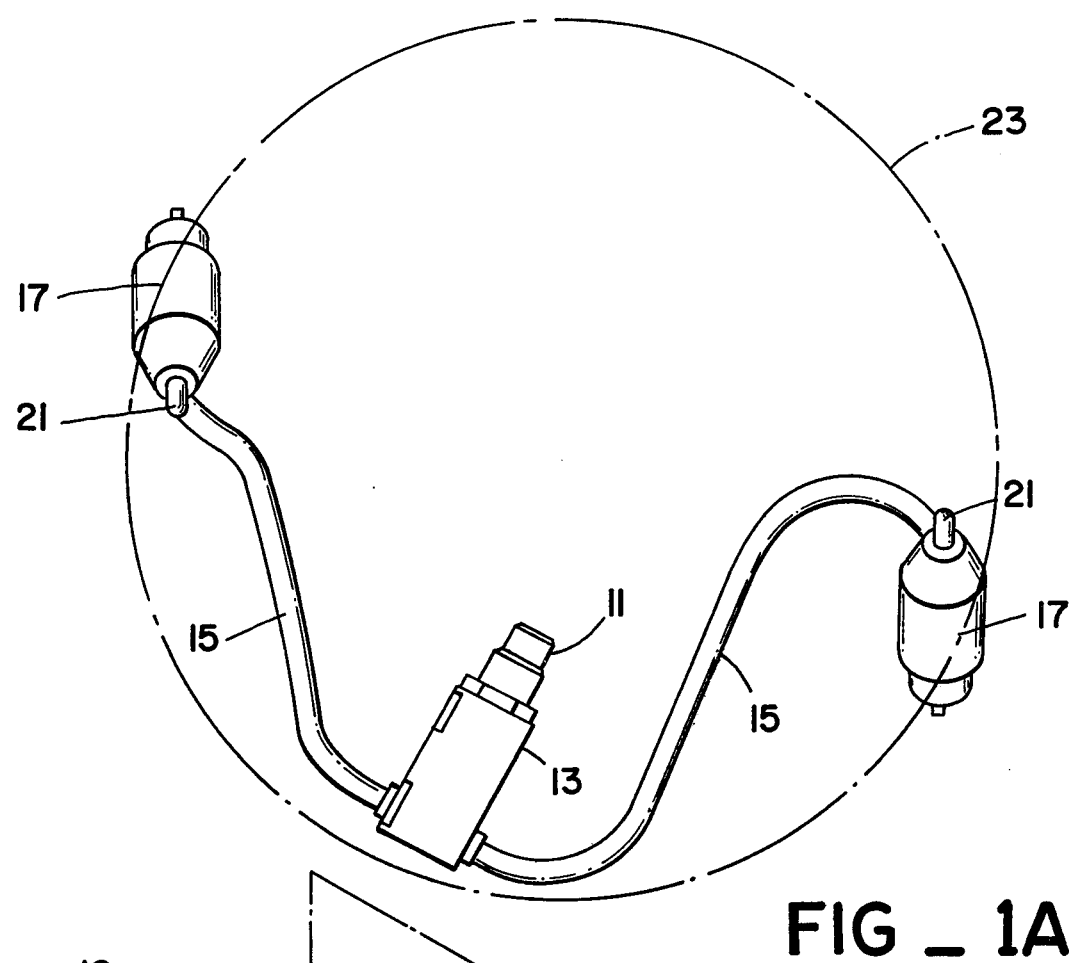
FIG _ 1A
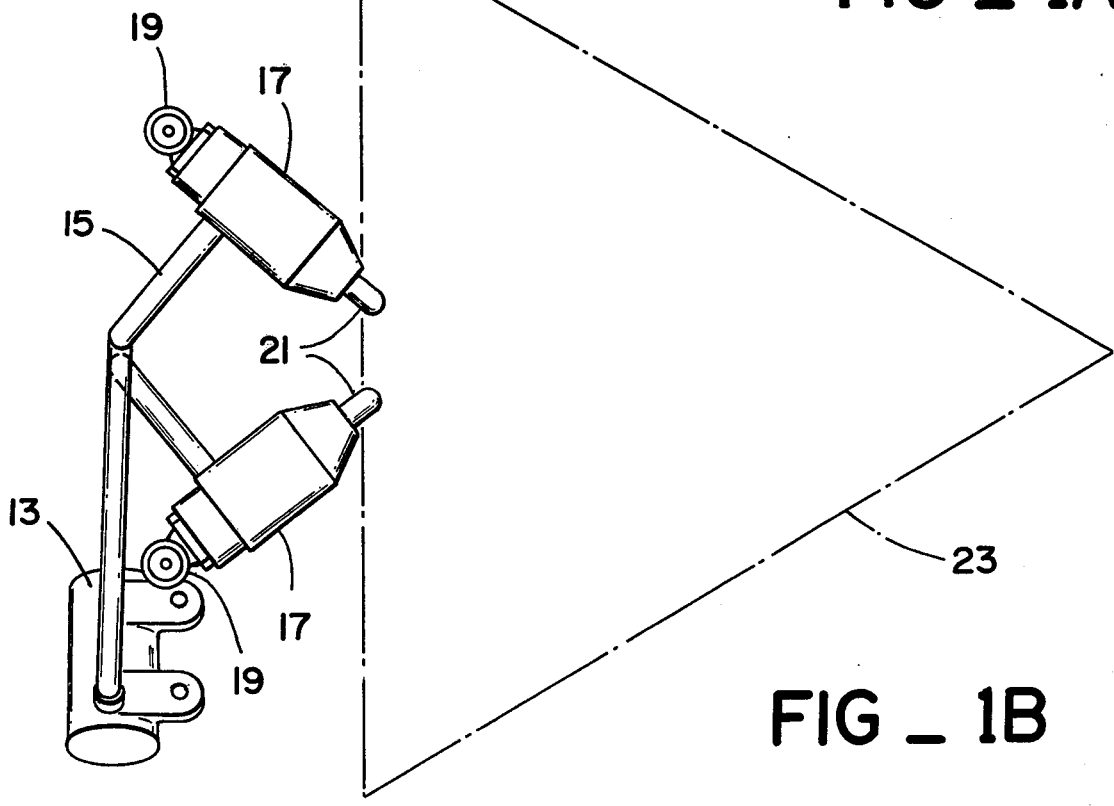
FIG _ 1B

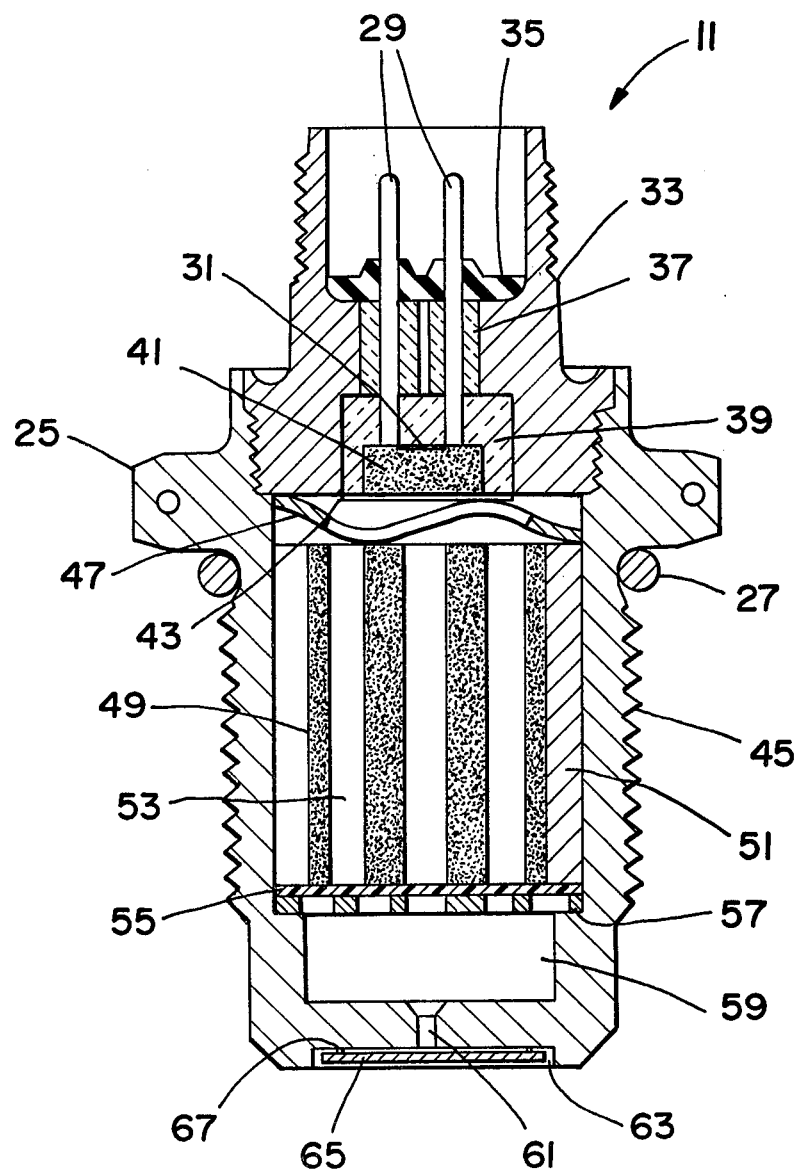
FIG_2

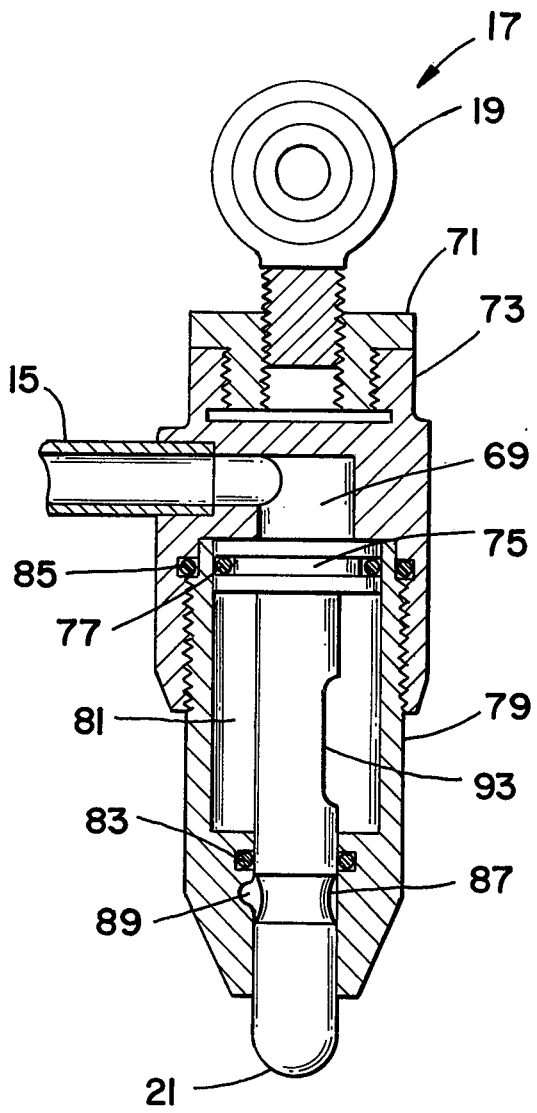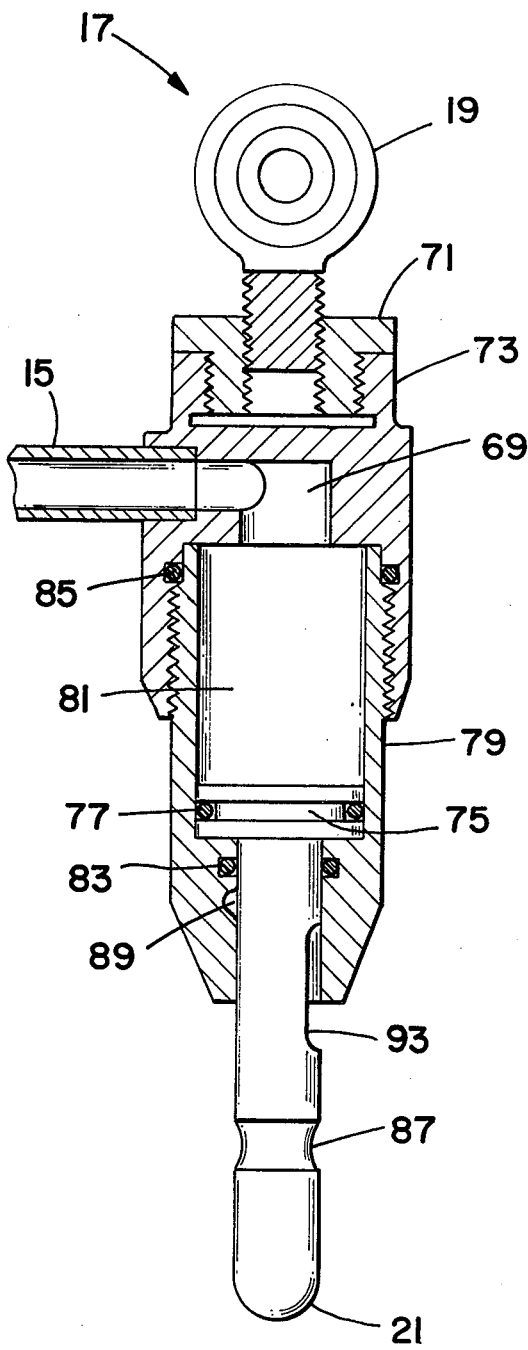
FIG_3A
FIG_3B

EJECTION SYSTEM

BACKGROUND OF THE INVENTION

1. Field of the Invention

The present invention relates to projectile launch systems. In particular, it relates to systems for imparting a preselected combination of linear and rotational momentum to a stationary object such as a missile payload.

2. Description of the Prior Art

Ordnance cartridges are commonly employed to impart an ejection force to a missile payload or other projectile. Often such a cartridge activates a device sensitive to high pressure gases. The device normally functions as an active interface between the cartridge and projectile, sheltering the projectile from an otherwise destructive explosion while transferring the force generated by the cartridge.

Frequently it is necessary to impart both linear and rotation forces to the projectile. Rotation is necessitated by high-altitude projectile launch. Under normal atmospheric pressures a fin (coupled, of course with steering means) will be sufficient to guide and direct a projectile or missile payload accurately. However, the near-vacuum atmosphere encountered at 300,000 feet, for instance, makes such a control device inapplicable, necessitating payload rotation and the resultant gyroscopic forces for stability.

A prior configuration to generate rotation at payload launch is employment of oppositely-directed circumferential forces. Such oppositely directed forces may be imparted by cartridge-activated thrusters. Each cartridge is separately coupled both to the ignition signal and separately coupled to an associated thruster. A problem commonly encountered when such thruster-induced rotation is employed in the introduction of an undesired off-course force vector due to the non-uniform dual thruster ignition time and force applied at projectile launch.

The present invention overcomes the timing and undesired force problems associated with prior art while conserving electrical and fuel energy by providing a closed ejection system.

SUMMARY OF THE INVENTION

The present invention basically includes a pair of thrusters designed to engage a projectile at such a fixed angle as to impart a desired combination of forces when activated. A manifold tube commutes between the thrusters and a slow release cartridge. Upon ignition of the cartridge, gases enter the manifold tube to cause simultaneous thruster action, avoiding tipoff and other problems associated with the introduction of undesired force components.

STATEMENT OF THE OBJECTS OF THE INVENTION

An object of the present invention is to provide a projectile ejection system which minimizes system energy input.

Yet another object of the present invention is to achieve the above object by means of a closed system configuration.

Still another object of the present invention is to provide a projectile ejection system which reliably imparts a desired combination of rotation and linear translation to a projectile at launch.

Another object of this invention is to achieve a projectile launch system especially adaptable to high-altitude projectile launch from a missile.

Other objects, advantages and novel features of the invention will become apparent from the following detailed description of the invention when considered in conjunction with the accompanying drawings wherein:

BRIEF DESCRIPTION OF THE DRAWINGS

FIGS. 1A and 1B are perspective views of the system of the present invention;

FIG. 2 is a side view of the cartridge of the present invention; and

FIGS. 3A and 3B are pre-firing and post-firing side views of the thruster of the present invention.

DESCRIPTION OF THE PREFERRED EMBODIMENT

Turning now to the drawings, there is shown in FIGS. 1A and 1B perspective views of the overall invention. The invention is seen to comprise essentially a cartridge 11 contained within a manifold chamber 13 which commutes by means of a two-sectioned manifold tube 15 with a pair of thrusters 17. Each thruster has a turnbuckle 19 at one end and a piston 21 at the opposite end. The turnbuckle 19 serves as a point of attachment of the thruster 17 to a carrier such as a missile body (not shown) which serves as a projectile launch platform, while the piston 21 is mounted against a projectile 23 to which both angular and linear force is to be applied by the present invention.

The turnbuckles 19 attached to the thrusters 17 allow the linear travel of the thrusters 17 until intimate contact is achieved between payload or projectile 23 and the pistons 21. Such intimate contact is necessary to ensure that the two contact points of the projectile 23 receive an equal and simultaneous impulse from the pistons 21. The failure to achieve such a thrust will cause the projectile 23 to face a tipoff problem in terms of linear translation and an unwanted force vector transverse to its desired linear travel. In an operational embodiment of the present invention the pistons 21 are calibrated for a 1.1 inch travel, though such dimension is given only for the purpose of example and is by no means to imply a limitation. The manifold tube 15 must be dimensionally controlled to introduce none of the de-stabilizing effects discussed above. The significance of the dimensional parameters associated with the tube 15 will become evident following the discussions of other system elements infra.

FIG. 2 presents a side view of the type of cartridge 11 required for satisfactory operation within the present invention. It is seen that the cartridge is outwardly threaded and has a flange 25 to accommodate itself to manifold chamber 13. An O-ring 27 serves to aid in sealing the system from leakage. The chamber 13 commutes laterally with both sections of manifold tube 15, serving to transfer the gases emergent from cartridge 11 therethrough. It will be seen that the cartridge 11 is of the slow release type as opposed to the high pressure type. A slow release cartridge 11 will bleed gas into the manifold tube 15 at a relatively low rate. This relatively slow transfer of the gases allows the two portions of manifold tube 15 to function as one chamber, providing identical pressures at the two thrusters 17 regardless of the equality or inequality of the lengths of the two portions of manifold tube 15.

A pair of electrical leads 29 act in conjunction with bridgewire 31 to form an initiating circuit responsive to electrical signals from the missile or other system. The leads 29 pass into upper cartridge body 33. An insulating seal 35, preferably of rubber, provides both electric insulation and environmental protection for the initiating circuit. Within the upper cartridge body 33 cylindrical seals 37, preferably of glass, encircle the leads 29 providing electrical insulation. The lower ends of leads 29 and bridgewire 31 are encased within ceramic charge holder 39. The bridgewire 31 passes through the ignition charge 41 which is contained within the charge holder 39. An insulation disc 43 located at the bottom of charge holder 39 serves to retain ignition charge 41 therein prior to ignition.

Lower cartridge body 45 is threadedly engaged to upper cartridge body 33. O-ring 27 sits beneath flange 25 of lower cartridge body 45, serving to seal gases emerging from the bottom of the cartridge 11 from an upward escape from manifold chamber 13. A wave washer 47 which serves to protect solid propellant 49 from missile vibration sits in a chamber interiorly formed between upper cartridge body 33 and lower cartridge body 45. The washer periodically abuts against portions of upper cartridge body 33 while maintaining peripheral contact with lower cartridge body 45.

Three grain spacers 51 are located 120° apart at the interface of solid propellant 49 and lower cartridge body 45. Holes 53 exist throughout the length of the propellant 49. The holes serve to increase the burn surface of the solid propellant 49. The grain spacers, which may be of square cross section, measure 0.05 inch by 0.05 inch in an actual embodiment of the cartridge 11 of the present invention. The solid propellant 49 sits upon a plastic disc 55 which in turn rests upon grain trap 57. The grain trap 57 may be fashioned of steel and has a plurality of holes therethrough. The plastic disc 55 serves to retain the solid propellant 49 prior to ignition, thus keeping the grain trap 57 clear and aiding the pressure build-up caused by ignition charge 41 which serves to ignite the solid propellant 49. After ignition, plastic disc 55 is blown out allowing the passage of the high pressure gases through the perforated steel grain trap 57.

The high pressure gases produced by the burning of solid propellant 49 enter chamber 59 in lower cartridge body 45. An orifice 61 is located at the bottom of the chamber 59 to allow the eventual release of the gases. A lower chamber 63 exists beneath orifice 61 having a closure disc 65 located therein. The closure disc 65 is spaced from the top of lower chamber 63 by a circling ridge 67 formed thereon. The ridge 67 provides a more effective seal between closure disc 65 and lower chamber 63 than the abutment of two plane surfaces of possibly uneven or nonmatching finish. It concentrates the critical area of contact between the two surfaces to ensure the air tight seal desired. The closure disc 65 is fastened to ridge 67 such that it will be dislodged only by the incidence of a preselected amount of force. The "slow bleed" quality of the cartridge 11, an essential quality for effective operation of the present invention is achieved by the configuration of the bottom of the lower cylinder body 45 with special regard to the chamber 59, orifice 61 and closure disc 65 by which a lower cylinder exhaust pressure is achieved than that existing in chamber 59 during the burning of solid propellant 49. For example, a cartridge 11 having the design shown in FIG. 2 has been constructed to achieve an exhaust pressure of 2500 p.s.i. while obtaining a 5000 p.s.i. pressure in chamber 59.

Gases generated by the ignited cartridge 11 are contained and flow throughout the manifold chamber 13 and two sectioned manifold tubes 15. No valves exist therebetween, assuring the attainment of an identical amount of pressure throughout. Optimal design of the manifold tubes 15 takes into account the fact that the creation of an overly large chamber will result in excessive heat loss and timing delays from the instant of application of current to the electrical contacts 29 to the imparting of energy to the projectile 23. A larger cartridge 11 will be required, resulting in excessive energy usage.

A manifold tube 15 of insufficient diameter will result in a pressure imbalance in the two sections of the tube 15. This is due to the occurrence of "choking" within the stream of pressurized gases entering the tubes 15 from manifold chamber 13. The problems associated with prior art independent acting thrusters are then to be encountered such as tipoff and introduction of undesired force vectors. The two thrusters 17 will be caused to act independent of each other because choking within the manifold tubes 15 destroys the "one chamber" effect necessary for their simultaneous activation.

Regarding now FIGS. 3A and 3B, there is shown in detail a thruster 17 of the present invention. Manifold tube 15 commutes with the thruster 17 by entering at upper chamber 69. The previously discussed turnbuckle knob 19 adjoins the thruster 17, threadedly engaging plug 71. The threaded engagement allows the linear translation of the thruster 17 for intimate pre-ignition contact of piston 21 with projectile 23. The plug is in turn threadedly engaged to upper thruster body 73 in which upper chamber 69 exists. The bottom of upper chamber 69 in the pre-firing orientation of FIG. 3A is seen to comprise the upper face of piston head 75. The piston head 75 is formed as one unit with piston 21 and comprises a disc-like three deck arrangement. Such construction provides, by means of an inner peripheral recess, a convenient location for piston O-ring 77. The O-ring 77 existing between piston head 75 and lower thruster body 79, to which upper thruster body 73 is threadedly engaged forming lower chamber 81 assures an air tight seal necessary for effective thruster 17 operation. Lower piston O-ring 83 similarly serves to provide a desired air tight seal between piston 21 and lower thruster body 79 during certain phases of thruster 17 operation. O-ring 85 assures that the threaded engagement of upper thruster body 73 and lower thruster body 79 will be air tight.

It is seen that the piston 21 has a constriction 87 near its nose portion. The constriction 87 is located to match the safety recess 89 in lower thruster body 79 during the pre-ignition of FIG. 3A. A pin may be inserted through lower thruster body 79 to retain the piston 21 for pre-firing safety. Piston recess 93 is so designed and located to provide for release of pressure built up in lower thruster chamber 81 by compression of lower chamber volume. Such compression is due to the downward movement of the piston 21 as seen in FIG. 3B. The failure to release such built-up pressure in lower chamber 81 would otherwise result in mechanical resistance and slowed system response. The release is achieved by the fact that recess 93 is of sufficient length to provide a passageway for gases from lower chamber 69 to the atmosphere during an instant of the downward travel of piston 21.

Thus it may be seen that the present invention achieves an ejection system which may simultaneously impart identical ejection forces on two or more portions of a projectile.

What is claimed is:

1. An ejection system which comprises:
   a. a cartridge;
   b. said cartridge mounted at its lower portion to a manifold chamber to contain gases when emergent therefrom;
   c. said manifold chamber having a pair of apertures;
   d. a manifold tube having two sections, the end of each section joining said manifold chamber at one of said apertures, and having a diameter such that said two sections function as one chamber; and
   e. a pair of thrusters, each joined to the other end of one of said sections of said manifold tube and mounted to a carrier at such an angle to provide desired linear and rotational force components to a projectile.

2. An ejection system as described in claim 1 wherein said cartridge comprises:
   a. a source of high pressure gases; and
   b. means for converting said high pressure gases to a constant lower pressure gas output to said manifold tube.

3. An ejection system as described in claim 2 wherein each of said thrusters comprises:
   a. an interior upper chamber located in that portion of each of said thrusters that commutes with said manifold tube;
   b. an interior lower chamber;
   c. a piston having a head portion attached at one end;
   d. said head portion being of greater cross section than said piston and of equal cross section to the interior cross section of said interior lower chamber;
   e. said piston being located in said interior lower chamber, its head portion separating said piston from said interior upper chamber whereby the introduction of pressure to said interior upper chamber causes said piston to move downward.

4. An ejection system as described in claim 3 wherein:
   a. said interior lower chamber has a hole in the bottom thereof;
   b. said hole being equal in dimension to the diameter of said piston; and
   c. said piston protrudes outside said thruster body through said hole.

5. An ejection system as described in claim 4 wherein:
   a. said piston has an identation;
   b. said indentation is of sufficient length to allow said interior lower chamber to commute with the environment outside of said thruster during the downward travel of said piston.

6. An ejection system as described in claim 5 wherein a turnbuckle is located at the top of each thruster.

* * * * *